United States Patent [19]

Kasuga et al.

[11] Patent Number: 5,279,175
[45] Date of Patent: Jan. 18, 1994

[54] BALL SCREW INTEGRATED TYPE LINEAR MOVEMENT GUIDING UNIT

[75] Inventors: Shinichi Kasuga; Nobumitsu Takahashi, both of Gunma, Japan

[73] Assignee: NSK Ltd., Tokyo, Japan

[21] Appl. No.: 888,638

[22] Filed: May 27, 1992

[30] Foreign Application Priority Data

May 31, 1991 [JP] Japan .................. 3-129691

[51] Int. Cl.$^5$ ............................. F16H 25/22
[52] U.S. Cl. .................. 74/459; 74/424.8 R; 384/45
[58] Field of Search ............... 74/89.15, 424.8; 384/45

[56] References Cited

U.S. PATENT DOCUMENTS

| | | | |
|---|---|---|---|
| 4,023,433 | 5/1977 | Schutz | 74/459 X |
| 4,074,585 | 2/1978 | Richaud et al. | 74/459 X |
| 4,953,418 | 9/1990 | Hirose | 74/459 X |
| 5,074,160 | 12/1991 | Kasuga | 74/459 |
| 5,109,720 | 5/1992 | Kasuga | 384/45 |

FOREIGN PATENT DOCUMENTS 2-12554 1/1990 Japan .

*Primary Examiner*—Allan D. Herrmann
*Attorney, Agent, or Firm*—Sughrue, Mion, Zinn, Macpeak & Seas

[57] ABSTRACT

A ball screw integrated type linear movement guiding unit including a guide rail, a male-threaded screw shaft, a nut having a female-threaded screw hole formed therein and end caps fastened to the opposite end surface of the nut, wherein a plurality of first through holes are drilled through the nut in the axial direction for building a linear movement guiding system in cooperation with ball rolling grooves on the guide rail and the nut, a plurality of second through holes are drilled through the nut in the axial direction in parallel with the first through holes for building a ball screw system in cooperation with ball screw grooves in the screw shaft and the ball screw grooves on the screw shaft, a plurality of first curved passages are formed in each of the end caps while building the linear movement guiding system in cooperation with the first through holes, and a plurality of second curved passages are formed in each of the end caps while building the ball screw system in cooperation with the second through holes. Each of the first and second curved passages is built by forming a semicircular recess having a large diameter and a semicylindrical recess having a small diameter in each of the end plates and then fitting a semicylindrical return guide to the semicylindrical recess.

5 Claims, 4 Drawing Sheets

BALL SCREW INTEGRATED TYPE LINEAR MOVEMENT GUIDING UNIT

BACKGROUND OF THE INVENTION

1. FIELD OF THE INVENTION

The present invention relates generally to a ball screw integrated type linear movement guiding unit preferably employable for, e.g., an actuating arm of a robot, a X-Y coordinate table or the like. More particularly, the present invention relates to a ball screw integrated type linear movement guiding unit which assures operation at a high speed, position determination with high accuracy and reduction of the number of components required for constructing the guiding unit.

2. DESCRIPTION OF THE PRIOR ART

A typical conventional ball screw integrated type linear movement guiding unit is disclosed in a Japanese Utility Model Laid-Open Publication No. Hei. 2-12554.

This conventional guiding unit includes a male-threaded screw shaft having a spirally extending ball screw groove formed around the outer surface thereof and a guide rail of which opposite side walls have an axially extending ball rolling groove formed on the inside wall surface, respectively, while the screw shaft is interposed between both the side walls of the guide rail. A nut is threadably engaged with the screw shaft via a number oddballs rolling through the ball screw groove. In addition, ball rolling grooves are formed on the opposite surfaces of the nut corresponding to the ball rolling grooves on both the side walls of the guide rail so that the nut linearly axially moves in the forward-/rearward direction via a number of balls rolling through the aforementioned ball rolling grooves.

With the conventional guiding unit constructed in the above-described manner, however, since a ball recirculating section in a ball screw system for recirculating balls through the ball screw groove on the screw shaft and the ball screw groove in the nut is constructed in a so-called U-shaped ball recirculating tube type so as to allow it to be fitted to the upper part of the nut, it is practically difficult that the screw shaft is designed to have a long lead. Thus, there arises a problem that it is difficult to satisfy requests raised from users for operation at a higher speed and position determination, with higher accuracy.

On the other hand, a ball recirculating section in a linear movement guiding system for recirculating balls through the ball rolling grooves on the guide rail and the nut is designed in the form of an U-shaped curved passage to be individually attached to the opposite end surface of the nut. Thus, there arises another problem that the number of components required for constructing the guiding unit is unavoidably increased, and moreover, an assembling operation is performed only with many manhours.

SUMMARY OF THE INVENTION

The present invention has been made in consideration of the aforementioned problems.

An object of the present invention is to provide a ball screw integrated type linear movement guiding unit wherein ball recirculating sections for both the systems, i.e., the ball screw system and the linear movement guiding system are arranged in each of end caps fastened to the opposite end surfaces of a nut, resulting in the number of components being reduced.

Another object of the present invention is to provide a ball screw integrated type linear movement guiding unit which assures operation at a high speed and position determination with higher accuracy.

According to the present invention, there is provided a ball screw integrated type linear movement guiding unit including a guide rail of which opposite side walls have ball rolling grooves formed thereon while extending in the axial direction, a male-threaded screw shaft arranged in parallel with the guide rail with ball screw grooves formed around the outer surface thereof, a nut having a female-threaded screw hole formed therein with ball screw grooves formed around the inner peripheral surface of the screw hole corresponding to the ball screw grooves on the screw shaft, the nut being threadably engaged with the screw shaft via a number of balls rolling through the ball screw grooves on the screw shaft and the ball screw grooves in the screw hole, opposite side walls of the nut having ball rolling grooves formed thereon corresponding to the ball rolling grooves on the guide rail so as to allow the nut to axially move in the forward/rearward direction via a number of ball rolling through the ball rolling grooves on the guide rail and the ball rolling grooves on the nut, and end caps fastened to the opposite end surfaces of the nut by tightening bolts, wherein the guiding unit comprises a plurality of first through holes each drilled through the nut in the axial direction to serve as a ball return passage for the balls rolling through the ball rolling groove on the guide rail and the ball rolling groove on the nut; a plurality of second through holes each drilled through the nut in the axial direction to serve as a ball return passage for the balls rolling through the ball screw groove in the screw hole and the ball screw groove on the screw shaft, the second through holes extending in parallel with the first through holes; a plurality of first curved passages each formed in each of the end caps so as to allow the ball rolling groove on the guide rail and the ball rolling groove on the nut to be communicated with the corresponding first through hole therethrough; and a plurality of second curved passages each formed in each of the end caps so as to allow the ball screw groove in the screw hole and the ball screw groove on the screw shaft to be communicated with the corresponding second through hole therethrough.

Not only each of the first curved passages but also each of the second curved passages is built by forming a semicircular recess having a large diameter and a semicylindrical recess having a smaller diameter while extending at a right angle relative to the semicircular recess in each of the end caps and then fitting a semicylindrical return guide to the semicylindrical recess.

Alternatively, each of the second curved passages may be built by combination of a semicircular recess formed in each of the end caps with a convex projection formed on each of the opposite end surfaces of the nut while extending between the corresponding second through hole and the corresponding ball screw groove in the screw hole.

To assure that balls easily recirculate through the ball return system, it is preferable that each of the end caps includes a plurality of spirally extending projections around an insert hole for the screw shaft corresponding to the ball screw grooves on the screw shaft. In this case, the foremost end of each spirally extending projection serves as a scooping projection for successively scooping balls from the corresponding ball screw groove on the screw shaft.

Other objects, features and advantages of the present invention will become apparent from reading of the following description which has been made in conjunction with the accompanying drawings.

DESCRIPTION OF THE PREFERRED EMBODIMENTS

Now, the present invention will be described in detail hereinafter with reference to the accompanying drawings which illustrate preferred embodiments of the present invention.

First, a ball screw integrated type linear movement guiding unit in accordance with a first embodiment of the present invention will be described below with reference to FIG. 1 to FIG. 6.

Figure 1:
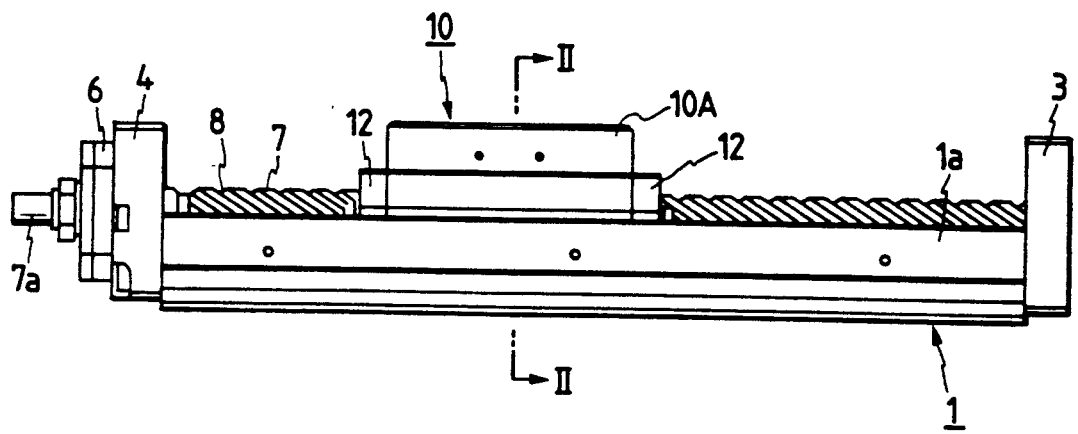
FIG. 1 is a side view of a ball screw integrated type linear movement guiding unit in accordance with a first embodiment of the present invention.
Figure 2:
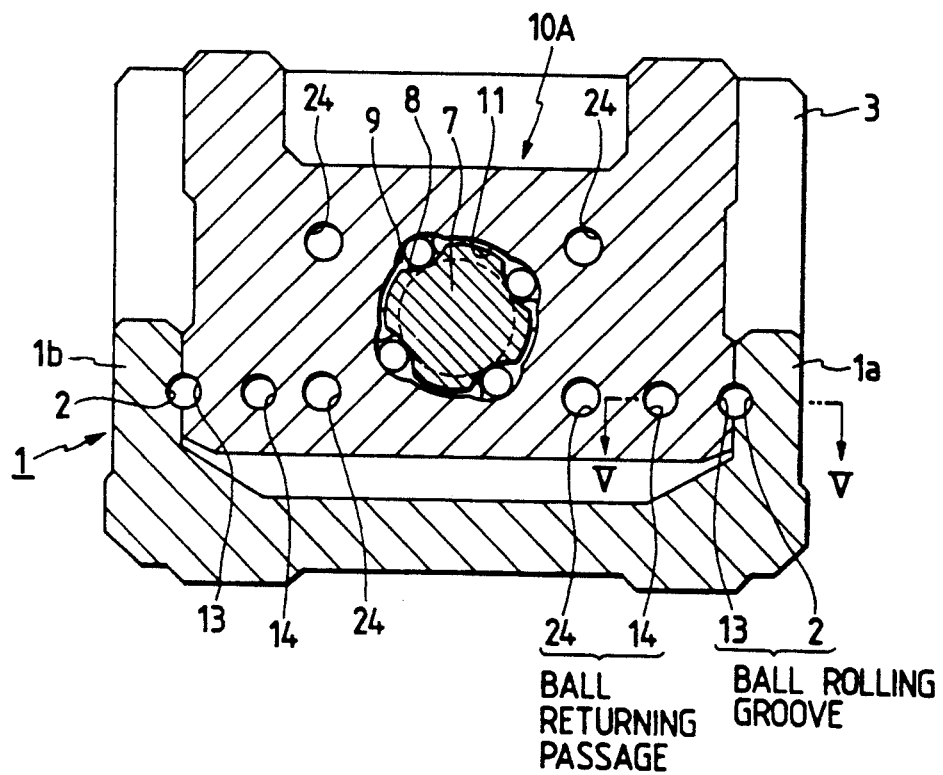
FIG. 2 is a cross-sectional view of the guiding unit taken along line II—II in FIG. 1.

As shown in FIG. 1 and FIG. 2, the guiding unit includes a guide rail 1 having a substantially U-shaped cross-sectional contour, and opposite side edge portions 1a and 1b stand upright from the bottom surface of the guide rail 1. An axially extending ball rolling groove 2 is formed on the inner surface of the side edge portion 1a at the position located opposite to that of the side edge portion 1b.

Bearing plates 3 and 4 are fastened to the opposite ends of the guide rail 1 by tightening bolts. The bearing plate 3 is provided with a ball bearing (not shown), while the bearing plate 4 is provided with two ball bearings (not shown) inclusive of a ball bearing in a bearing housing 6. A male-threaded screw shaft 7 is arranged across the central part midway between both the side edge portions 1a and 1b in parallel with both the ball rolling grooves 2 while it is rotatably supported by the ball bearings. In this embodiment, ball screw grooves 8 on the screw shaft 7 is prepared in the form of four-threaded grooves each having a long lead. One end 7a of the screw shaft 7, i.e., the left-hand end of the same is projected outside of the housing 6 so that it is operatively jointed to an output shaft of a driving motor (not shown).

Figure 3:
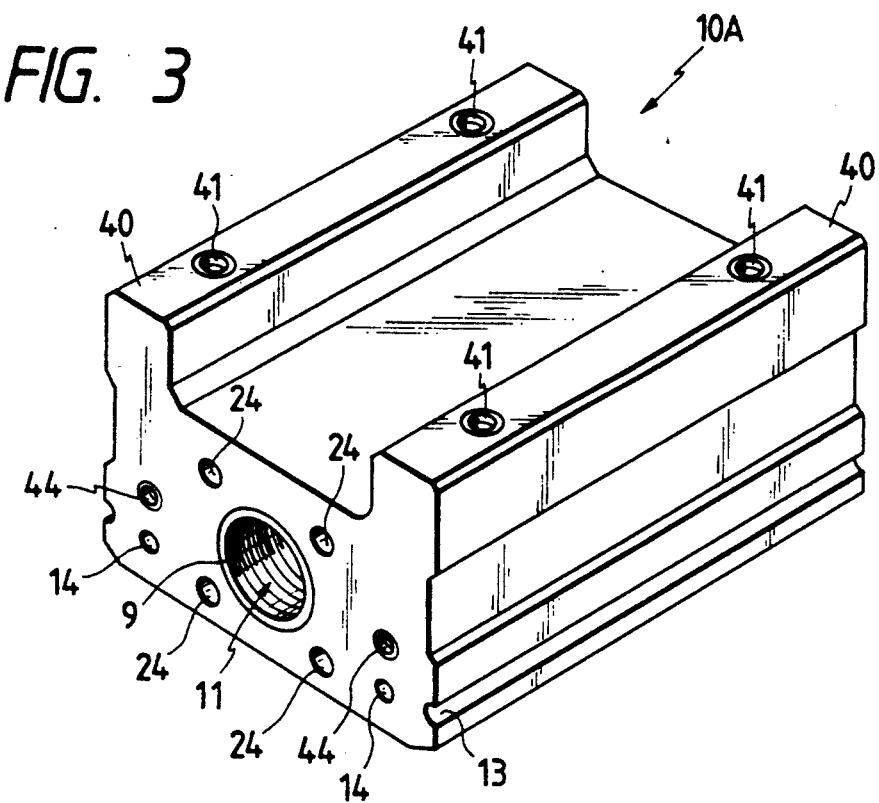
FIG. 3 is a perspective view of a nut for the guiding unit.

In FIG. 1, reference numeral 10 designates a nut which is threadably engaged with the screw shaft 7. The nut 10 is constructed of a parallelepiped-shaped main body 10A as shown in FIG. 3 and end caps 12 fastened to the opposite ends of the main body 10 by tightening bolts. Female-threaded ball screw grooves 9 are formed around the inner peripheral surface of a screw hole 11 formed at the central part of the main body 10A corresponding to the ball screw grooves 8 on the screw shaft 7. A width of the main body 10A is dimensioned to be slightly smaller than an interior width between both the side edge portions 1a of the guide rail 1. In addition, a ball rolling groove 13 located opposite to the ball rolling groove 2 on the guiding rail 1 side and a ball return passage 14 drilled in the form of a straight through hole extending in parallel with the ball rolling groove 13 are formed at the lower part of each of the opposite side walls of the main body 10A.

Figure 4:
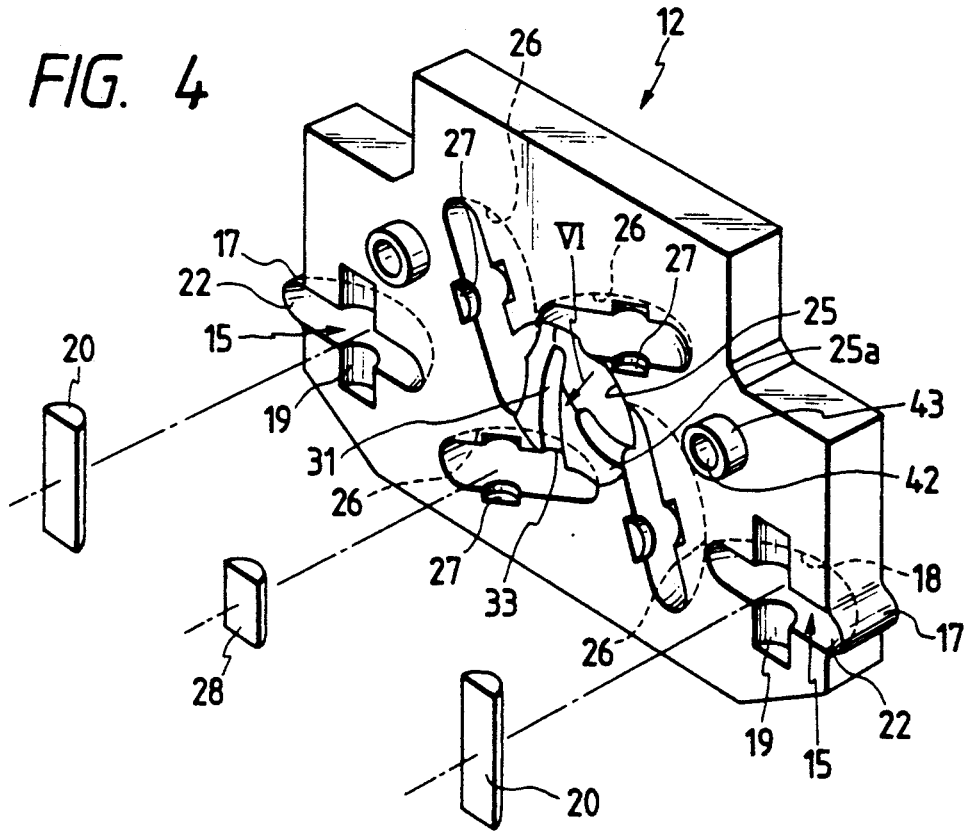
FIG. 4 is a perspective view of an end cap as seen from the nut side of the guiding unit.
Figure 5:
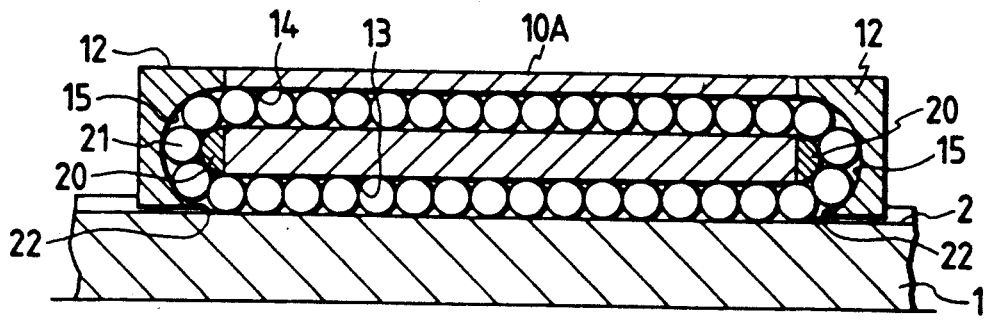
FIG. 5 is a sectional view of the guiding unit taken along line V—V in FIG. 2.
Figure 6:
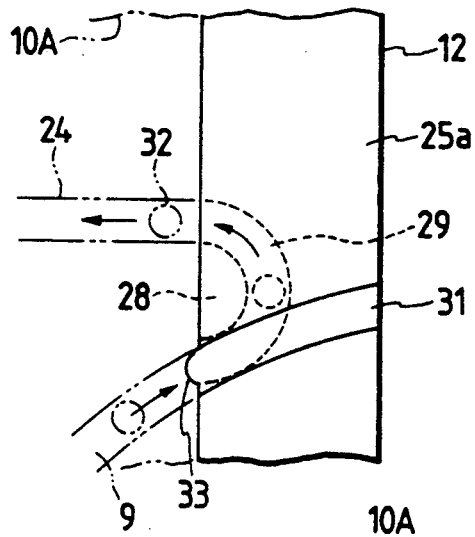
FIG. 6 is a fragmentary view of the guiding unit as seen in the VI-arrow marked direction in FIG. 4.

On the other hand, as shown in FIG. 4 and FIG. 5, half doughnut-shaped curved passages 15 by way of which each ball rolling groove 13 is communicated with each ball return passage 14 are formed on the inner end surface of each end cap 12 along which the main body 10A comes in close contact with the end cap 12.

The structure of each half doughnut-shaped curved passage 15 will be described in more detail below with reference to FIG. 4. It should be noted that description will hereinafter occasionally be made only with respect to one half of the guiding unit for the purpose of simplification, because the guiding unit is constructed in the symmetrical relationship relative to the axial direction thereof. A sideward projection 17 adapted to be engaged with the ball rolling groove 2 on the guide rail 1 is formed on the side wall of each end cap 12, and a semicircular recess 18 having a large diameter is formed in the region ranging from the inner end of the projection 17 to the close contact plane between the main body 10A and the end cap 12. In addition, a semicylindrical recess 19 having a small diameter and extending at a right angle relative to the opening of the semicircular recess 18 is formed at the central part of the opening of the semicircular recess 18. Formation of the half doughnut-shaped curved passage 15 is completed by fitting a semicylindrical return guide 20 into the semicylindrical recess 19. Consequently, as shown in FIG. 5, an endless ball recirculating passage for the linear movement guiding system composed of the ball rolling groove 2 on the guide rail 1, the ball rolling groove 13 located opposite to the ball rolling groove 2, the return passage 14 and the curved passage 15 in the above-described manner is constructed in the lower part of the nut 10. A number of balls 21 are received in the endless ball recirculating passage in such a manner as to freely roll therein. As is best seen in FIG. 4, the inner end of the projection 17 on the side wall of the end cap 12 coinciding with one end of the curved passage 15 is formed to serve as a scooping projection 22 for successively scooping the balls 21 from the ball rolling groove 2 and then smoothly introducing them into the curved passage 15. Although any illustration is neglected, the guiding unit may be provided with a conventional ball holding mechanism for the purpose of preventing disconnection of the balls 21 from the ball rolling groove 13 by forming a relief groove on the bottom of the curved passage 15 and then engaging a holder with the relief groove via an arc-shaped bent part located at one end of the holder made of a straight wire material.

In addition, four straight through holes 24 are formed around the screw hole 11 in the circumferentially equally spaced relationship to serve as a ball return passage for the ball screw return system, respectively. On the other hand, corresponding to the foregoing through holes 24, four semicircular recesses 26 each having a large diameter and slantwise extending in the tangential direction are formed on the close contact plane between the main body 10A and the end cap 12 around an insert hole 25 for screw shaft 7 in the circumferentially equally spaced relationship (see FIG. 4). In addition, a semicylindrical recess 27 having a small diameter and extending at a right angle relative to the opening of the semicircular recess 26 is formed at the central part of the opening of each semicircular recess 26, whereby a substantially half doughnut-shaped curved passage 29 (see FIG. 6) is formed by fitting a semicylindrical return guide 28 into the semicylindrical recess 27. Each curved passage 29 for the ball screw system serves to communicate each of four ball screw grooves 8 on the screw shaft 7 with the corresponding ball return passage 24. Additionally, four spirally extending projections 31 corresponding to the four ball screw grooves 8 on the screw shaft 7 are formed around an inner peripheral surface 25a of the insert hole 25 for the screw shaft 7 so as to be engaged with the respective ball screw grooves 8 on the screw shaft 7, while intersecting the curbed passages 29. With such construction, an endless ball recirculating passage for the ball screw system comprising the ball screw groove 8 on the screw shaft 7, the ball screw groove 9 in the nut 1 located corresponding to the ball screw groove 8, the ball return passage 24 and the curved passage 29 is formed in the same manner as the endless ball recirculating passage for the linear movement guiding system. Similarly, a number of balls 32 (see FIG. 6) are received in the endless ball recirculating passage in such a manner as to freely roll therein. Each spirally extending projection 31 serves as a dust-proofing seal for the ball screw groove 8 on the screw shaft 7, and moreover, one end of the spirally extending projection 31 opposite to the ball screw groove 9 is formed as a scooping projection 33 for successively scooping the balls in the ball screw groove 8 and then smoothly introducing them into the curved passage 29.

As shown in FIG. 3, the opposite sides of the main body 10A are elongated in the upward direction to provide table mounting boards 40, and female-threaded holes 41 are formed on the table mounting boards 40 for the purpose of securing the guiding unit to a table (not shown).

Further, as shown in FIG. 4, position determining projections 43 are formed on the close contact plane side of fitting bolt insert holes 42 drilled through the end cap 12 so that they are fitted into recesses formed on the end surface of the nut 10A corresponding to the fitting bolt insert holes 44, whereby not only the endless ball recirculating passages for the linear movement guiding system but also the endless ball recirculating passages for the ball screw system can exactly be formed without deviation away from their given positions.

Next, a mode of operation of the guiding unit constructed in the aforementioned manner will be described below.

When the screw shaft 7 is rotated in the normal (reverse) direction by activating a driving motor (not shown), rotation of the screw shaft 7 is transmitted to the nut 10 via the balls 32 for the ball screw system interposed between the ball screw grooves 8 on the screw shaft 7 and the ball screw grooves 9 in the nut 10, causing the nut 10 to axially move in the forward (rearward) direction. At this time, rotation of the nut 10 is prevented by the balls 21 for the linear movement guiding system interposed between the ball rolling grooves 13 1D in the nut 10 and the ball rolling grooves 2 on the guide rail 1. As the nut 10 axially moves, the balls 21 and 32 for both the systems move while rolling so that they recirculate the endless ball recirculating passages for both the systems. At this time, the direction of recirculation of the balls 32 is changed by the curved passages 29 formed in each endless cap 12. Specifically, when the balls 32 reach one end cap 12 by their rolling movement through the ball screw grooves 8 on the screw shaft 7 and the ball screw 9 in the nut 10 as the nut 10 axially moves, they collide with the curved surface of the scooping projection 33, and thereafter, move in the curved passage 29 of the end cap 12 in which the direction of their rolling movement is turned by an angle of 180 degrees. Then, the balls 32 enter a ball return passage 24 in the main body 10A of the nut 10. When the balls 32 roll through the ball return passage 24 and reach the end cap 12 on the opposite side, they move in the curved passage 29 in which the direction of their rolling movement is changed in the reverse direction by an angle of 180 degrees to reach the end part of the spirally extending projection 31. Subsequently, they move in the curved surface of the scooping projection 33 and then return to the ball screw groove 8 on the screw shaft 7 and the screw groove 9 in the nut 10. Thereafter, same operations as mentioned above are repeated as desired.

As is apparent from the above description, in contrast with the conventional ball screw integrated type linear movement guiding unit, there is no need of arranging a tube for recirculating balls for the ball screw system, resulting in the number of components and the number of manhours required for an assembling operation being reduced.

In addition, in the first embodiment, since four lines of ball recirculating passages for the ball screw system are arranged around the screw shaft 7, the screw shaft 7 is designed in the form of a four-threaded screw shaft, causing a lead per one pitch to be enlarged by four times without any reduction of a loading capacity compared with the conventional screw shaft having a single thread. This makes it possible to feed the nut 10 at a speed as high as four times based on a same rotational speed of the screw shaft 7. On the contrary, the rotational speed of the screw shaft 7 can be reduced to a level of ¼ based on a same feed speed of the nut 10. Further, in the first embodiment, since each spirally extending projection 31 is aligned with the corresponding ball screw groove 8 on the screw shaft 7, it serves not only to guide rolling movement of the balls 32 with the aid of the scooping projection 33 at the foremost end thereof but also as a dust-proofing unit for the ball screw system.

Figure 7:
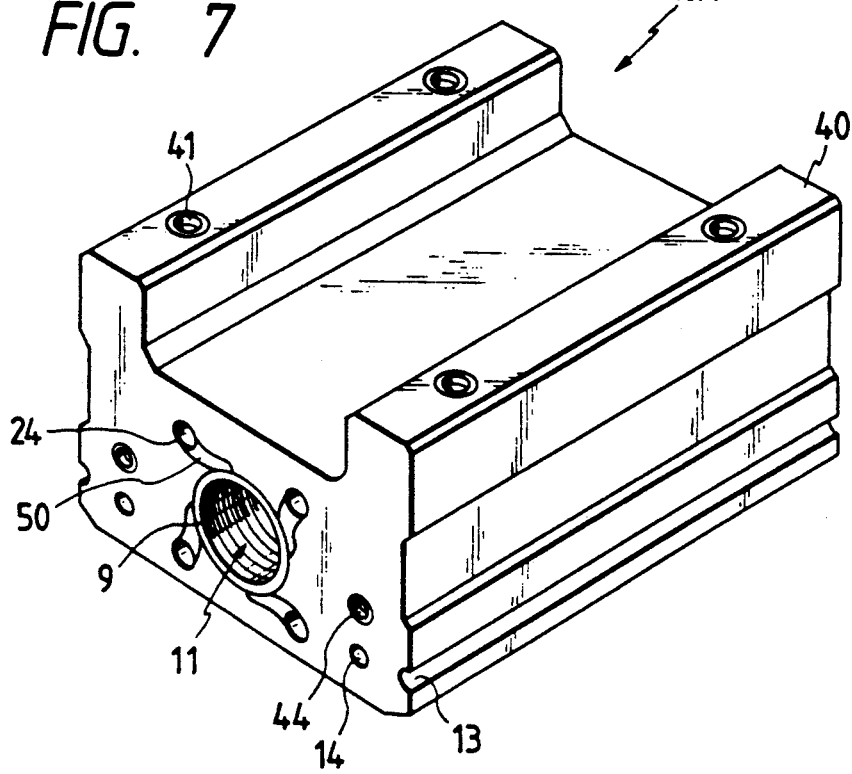
FIG. 7 is a perspective view of a main body of a nut o for a ball screw integrated type linear movement guiding unit in accordance with a second embodiment of the present invention.
Figure 8:
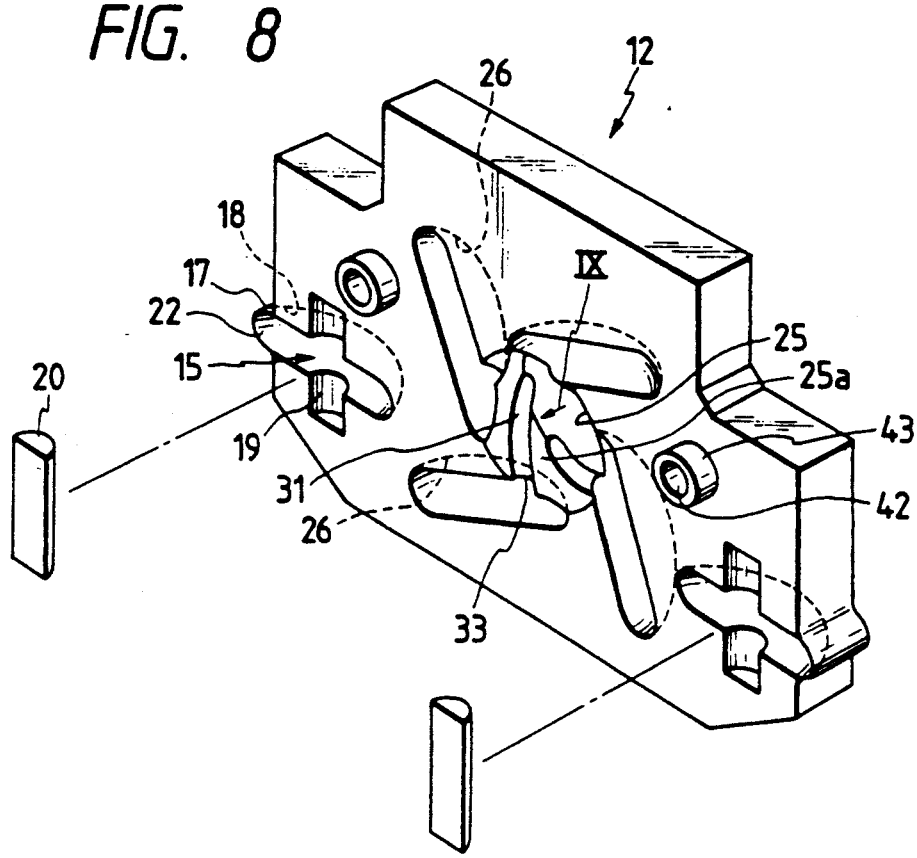
FIG. 8 is a perspective view of an end cap to be fastened to the main body of the nut in FIG. 7.
Figure 9:
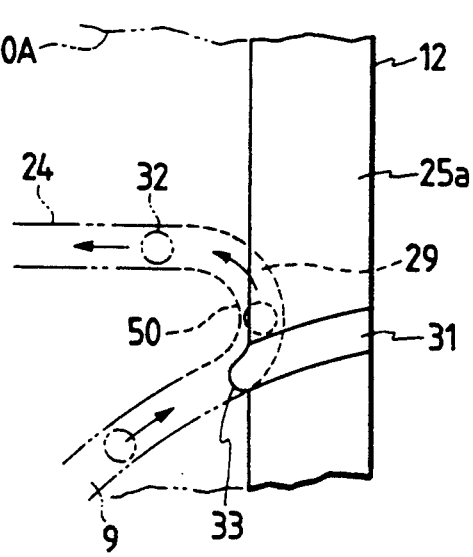
FIG. 9 is a fragmentary view of the guiding unit as seen in the IX-arrow marked direction in FIG. 8.

Next, a ball screw integrated type linear movement guiding unit in accordance with a second embodiment of the present invention will be described below with reference to FIG. 7, FIG. 8 and FIG. 9

In this embodiment, the structure of each curved passage 29 in each endless ball recirculating passage for the ball screw system is different from that in the preceding embodiment. Specifically, each semicircular recess 26 formed on the close contact plane of the end cap 12 while having a large diameter does not include a semicylindrical recess having a small diameter like the semicylindrical recess 27 formed at the central part of the opening of the semicircular recess 26 in accordance with the preceding embodiment. For this reason, a semicylindrical return guide to be fitted to the semicylindrical recess 27 is not required. On the other hand, as shown in FIG. 7 and FIG. 9, four convex projections 50 each continuously extending from the outlet of the ball return passage 24 to the screw hole 11 and then smoothly communicating with the corresponding ball screw groove 9 in the screw hole 11 are formed on the respective end surfaces of the main body 10A. When each projection 50 is fitted to the corresponding semicircular recess 26 on the end cap 12, it serves as a return guide so that a curved passage 29 is built by the semicircular recess 26 in cooperation with the projection 50.

Other structure rather than the aforementioned one is same to that in the first embodiment. It should be added that a mode of operation and advantageous effects are same as those in the first embodiment without any particular change or variation.

In each of the aforementioned embodiments, the present invention has been described with respect to a case that a single line of endless ball recirculating passage for the linear guiding system is formed on one side of the guiding unit. However, the present invention should not be limited only to this. Alternatively, the present invention may equally be applied to a case that plural lines of endless ball recirculating passages are formed on one side of the guiding unit.

Similarly, the present invention should not be limited only to four lines of endless ball recirculating passages for the ball screw system. The number of lines of endless ball screw recirculating passages for the ball screw system may be increased or decreased corresponding to the number of threads of a multithread.

As described above, the ball screw integrated type linear movement guiding unit according to the present invention comprises a plurality of first through holes each drilled through the nut in the axial direction to serve as a ball return passage for the balls rolling through the ball rolling groove on the guide rail and the ball rolling groove on the nut; a plurality of second through holes each drilled through the nut in the axial direction to serve as a ball return passage for the balls rolling through the ball screw groove in the screw hole and the ball screw groove on the screw shaft, the second through holes extending in parallel with the first through holes; a plurality of first curved passages each formed in each of the end caps so as to allow the ball rolling groove on the guide rail and the ball rolling groove on the nut to be communicated with the corresponding first through hole therethrough; and a plurality of second curved passages each formed in each of the end caps so as to allow the ball screw groove in the screw hole and the ball screw groove on the screw shaft to be communicated with the corresponding second through hole therethrough. According to this construction, it is not necessary to use a U-shaped ball recirculating tube of the ball screw system, which was conventionally formed in the nut, so that the number of components can be reduced and the number of assembling operations thereof can be reduced. Further, according to the present invention, it is possible to design a screw shaft with a long lead, so that a ball screw integrated type linear movement guiding unit having a higher speed and position determination with higher accuracy can be provided.

While the present invention has been described above with respect to preferred embodiments thereof, it should of course be understood that the present invention should not be limited only to these embodiments but various changes or modifications may be made without departure from the scope of the invention as defined by the appended claims.

What is claimed is:

1. In a ball screw integrated type linear movement guiding unit comprising:
a guide rail of which opposite side walls have ball rolling grooves formed thereon while extending in the axial direction;
a male-threaded screw shaft arranged in parallel with said guide rail with ball screw grooves formed around the outer surface thereof;
a female-threaded screw hole formed therein with ball screw grooves formed around the inner peripheral surface of said screw hole corresponding to said ball screw grooves on said screw shaft, said nut being threadably engaged with said screw shaft via a number of balls rolling through said ball screw grooves on said screw shaft and said ball screw grooves in said screw hole, opposite side walls of said nut having ball rolling grooves formed thereon corresponding to said ball rolling grooves of said guide rail so as to allow said nut to axially move in the forward/rearward direction via a number of balls rolling through said ball rolling grooves on said guide rail and said ball rolling grooves on said nut, said nut having a plurality of first through holes and a plurality of second through holes, each said first through holes being drilled through said nut in the axial direction to serve as a ball return passage for said balls rolling through said ball rolling groove on said guide rail and said ball rolling groove on said nut, each said second through holes being drilled through said nut in the axial direction to serve as a ball return passage for said balls rolling through said ball screw groove in said screw hole and said ball screw groove on said screw shaft, said second through holes extending in parallel with said first through holes; and
end caps fastened to the opposite end surface of said nut said end caps having a plurality of first curved passages and a plurality of second curved passages, each said first curved passages being formed in each of said end caps so as to allow said ball rolling groove on said guide rail and said ball rolling groove on said nut to be communicated with the corresponding first through hole therethrough, each said second curved passages being formed in each of said end caps so as to allow said ball screw groove in said screw hole and said ball screw groove on said screw shaft to be communicated with the corresponding second through hole therethrough.

2. The linear movement guiding unit according to claim 1, wherein each of said first curved passages is built by forming a semicircular recess having a large diameter and a semicylindrical recess having a small diameter while extending at a right angle relative to said semicircular recess in each of said end caps and then fitting a semicylindrical return guide to said semicylindrical recess.

3. The linear movement guiding unit according to claim 1, wherein each of said second curved passages is built by forming a semicircular recess having a large diameter and a semicylindrical recess having a small diameter while extending at a right angle relative to said semicircular recess in each of said end caps and then fitting a semicylindrical return guide to said semicylindrical recess.

4. The linear movement guiding unit according to claim 1, wherein each of said second curved passages is built by combination of a semicircular recess formed in each of said end caps with a convex projection formed on each of the opposite end surfaces of said nut while extending between the corresponding second through hole and the corresponding ball screw groove on said screw hole.

5. The linear movement guiding unit according to claim 1, wherein each end cap includes a plurality of spirally extending projections around an insert hole for said screw shaft corresponding to the ball screw grooves on the screw shaft, the foremost end of each of said spirally extending projections serving as a scooping projection for successively scooping balls from the corresponding ball screw groove on the screw shaft.

* * * * *